United States Patent

Makuch

[15] 3,693,557
[45] Sept. 26, 1972

[54] ADDITIVE FEED CONTROL FOR AIR POLLUTION CONTROL SYSTEMS

[72] Inventor: John A. Makuch, Granby, Conn.

[73] Assignee: Combustion Engineering, Inc., Windsor, Conn.

[22] Filed: July 8, 1971

[21] Appl. No.: 160,855

[52] U.S. Cl. .................................. 110/1 J, 110/1 K
[51] Int. Cl. .......................................... F23b 7/00
[58] Field of Search .......... 110/1 P, 1 J, 1 K; 431/2, 4

[56] References Cited

UNITED STATES PATENTS 3,320,906  5/1967  Domahidy .................. 110/1 J
3,520,649  7/1970  Tomany et al. .............. 110/1 J Primary Examiner—Kenneth W. Sprague
Attorney—Carlton F. Bryant et al.

[57] ABSTRACT

The method of and apparatus for controlling additive delivery to and circulation within an air pollution control system. The system of the invention controls the scrubber recycle flow rate and additive-to-fuel delivery ratio in response to an established pH operating level in the scrubber. The established pH operating level may be varied within limits in response to the sulfur oxide content of the gas leaving the scrubber for optimum additive usage.

9 Claims, 2 Drawing Figures

INVENTOR.
JOHN A. MAKUCH

INVENTOR.
JOHN A. MAKUCH
BY Stephen A. Schneeberger
ATTORNEY

ADDITIVE FEED CONTROL FOR AIR POLLUTION CONTROL SYSTEMS

BACKGROUND OF THE INVENTION

The invention relates to air pollution control systems and more particularly to the control thereof. More particularly still, the invention pertains to an additive feed control for furnace injection type air pollution control systems employing wet scrubbers. Still more particularly, it relates to an additive feed control system which provides for efficient utilization of the additive while concurrently maintaining fluids in the scrubber within desired pH limits and effecting the desired cleaning of flue gases and is particularly applicable to pollution control systems employing multiple scrubbers.

As is well known, the combustion of various fossil fuels results in the production of byproducts such as fly ash and various oxides of sulfur and other gases. The release of these elements above certain limits to the atmosphere may be objectionable. The problem is particularly significant with fossil fuel burning plants which consume large quantities of fossil fuel which may be high in sulfur content. Various systems have evolved for removing the above-mentioned particulate materials and noxious gases from the resulting flue gas. One type of system employs wet scrubbers which combine the solid particulate and gaseous component removal operations.

In this type of scrubber, the flue gas stream is passed through a scrubbing zone containing both an aqueous medium and a contact surface such as a bed of marble-like mobile elements. Wetting the particulate material entrained in the flue gas and also contacting it with the marbles of the bed serve to remove most of it from the flue gas stream. Removal of the various noxious gases is generally affected through the addition of an additive to the system which will chemically combine with the said noxious gases to form solids which may then be easily removed from the gas stream. With this type of scrubber, the additive which is usually a low cost alkaline earth metal salt such as limestone and/or dolomite may be added to the scrubbing zone without having first passed through the combustion area and becoming entrained within the flue gas. This type of additive introduction is sometimes referred to as a tail-end system. Another type of additive introduction is that referred to as furnace injection wherein the additive is introduced into the combustion area with the fossil fuel wherein it becomes calcined and entrained in the resulting flue gas and is subsequently conveyed to the scrubbing zone of the wet scrubber.

Furnace injection of the additive is often desirable because the calcining of the additive within the combustion area results in alkaline earth metal oxides which react to some degree with sulfur oxides in the flue gas stream prior to its introduction to the wet scrubber and may react with ash deposits on high temperature surfaces of the furnace to minimize their corrosion. Also, the corrosion of low temperature surfaces such as the air preheater is reduced since most of the $SO_3$ which would condense out on such surfaces has been reacted with the additive in the gas phase. The resulting alkaline earth metal sulfates and sulfites are solids, most of which are relatively insoluble in the aqueous medium in the scrubber and are easily removed from the flue gas stream. The alkaline earth metal oxides which do not combine with the various sulfur compounds prior to entering the scrubber remain available for reaction upon entering the scrubber and in fact react with water in the scrubber to form hydroxides which subsequently react to form alkaline earth metal sulfates and sulfites. Typically, most of the tail-end and furnace injection types of air pollution control systems provide means for recirculating a portion of the aqueous medium which results from the contact of the alkaline earth metal components and sulfur oxides of the flue gas with water sprays in the scrubbing zone. This recirculating fluid stream is also passed through the scrubbing zone and the alkaline earth metal oxides and hydroxides within the aqueous medium are available for additional reaction with the sulfur oxides in the scrubbing zone.

With growing concern about the levels of sulfur oxides and particularly $SO_2$ discharged to the atmosphere, the principal requirement of such an air pollution control system is that it achieve the degree of sulfur oxide removal required. This may generally be accomplished by providing an excess of additive to the system. This technique, however, has two shortcomings one being the additional cost of the excess supply of additive and the other being the large quantities of solid waste discharged from the system which must be disposed of in some manner. Further the pH of liquids in the system, particularly within the scrubbing zone of the wet scrubber, may experience significant variations due to changes in the sulfur content of the fuel, a change in the additive-to-fuel supply ratio and/or a change in the characteristics of the additive. The above factors, while not a major problem in tail-end systems, do present a significant problem in furnace addition types because of the increased reactivity of the additive through calcining. When the pH in this region is too low, the scrubber internals and particularly the plates which support the bed are subject to acid attack. When the pH is too high, precipitation occurs in the scrubbing zone and causes plugging of the scrubber bed.

In those installations in which large quantities of fossil fuel are combusted at a relatively rapid rate, it is generally not possible to provide a single wet scrubber to effect the required degree of $SO_2$ removal from the flue gas. More importantly, such installations, as for example steam generation units for electrical utilities, often operate under variable load conditions and accordingly, the rate at which flue gases are evolved may vary considerably. In order to obtain optimum scrubbing of the gas within a wet scrubber, it has been determined that the gas flow velocity through the scrubber should be maintained within a range of several hundred feet per minute. In order to accommodate this requirement, air pollution control systems are provided which have multiple wet scrubbers which are operated in parallel and which are selectively removable from or insertable into the system as load varies. In this manner the necessary flue gas flow rate through a scrubber is maintained. The use of plural wet scrubbers operated in parallel serves to compound the problem of optimally controlling additive supply to and pH levels within the various air pollution control systems and particularly those of the furnace injection type. Normally an additive-to-fuel supply rate ratio is established which provides sufficient additive to the scrubbing system to effect the desired degree of sulfur oxide removal from the flue gas. This presupposes, in the instance where several scrubbers are operating in parallel, that the additive entrained in the flue gas has the same ratio to the sulfur oxides in each gas stream to each scrubber. However, because the flue gas paths from the furnace to the several scrubbers may vary considerably from one to another in length and geometry, the additive to sulfur oxide ratio in these paths may differ from one another, resulting in different sulfur oxide removal conditions at each scrubber. Such variations may result in comparable variations in the pH's within the scrubbing zones of the scrubbers.

Until the present, most furnace injection type air pollution control systems have relied solely upon an operator established additive-to-fossil fuel feed ratio and an operator established recycle flow rate for the aqueous medium in the scrubber. The only change being made with this type of control is that of occasionally increasing or decreasing the additive-to-fuel ratio to effect increased or decreased $SO_2$ removal. However, such limited control is incapable of meeting the problems mentioned above, particularly those in systems employing multiple scrubbers in parallel.

SUMMARY OF THE INVENTION

According to the invention, there is provided for a furnace air pollution control system of the furnace injection type, a control arrangement for closely controlling the pH within the system, particularly within the scrubbing zone of a wet scrubber, through management of an alkaline additive, both at the point of initial introduction of the additive to the system and at a recycle location. The invention is particularly applicable to air pollution control systems which employ a plurality of wet scrubbers operating in parallel. The control arrangement further provides for varying the pH control function within limits in response to variations in the additive characteristics as indicated by the content of sulfur oxides in the flue gas following the wet scrubbing operation.

That alkaline earth metal oxide which has not yet reacted contacts the aqueous medium existing within the scrubbing zone and is collected with the aqueous medium in a recycle tank, usually at the bottom of the scrubber. When the alkaline earth metal oxides enter this aqueous environment, a further reaction begins to occur in which the oxides become hydroxides and these hydroxides are subsequently available through recirculation for additional reaction with sulfur oxides in the scrubbing zone. The alkaline earth metal hydroxides present in the recirculated aqueous medium in addition to removing sulfur oxides from the flue gas, may also serve to control the pH of fluids within the scrubbing zone. The recycle tank is large enough to contain a substantial quantity of the aqueous medium. This storage capability of the recirculation loop provides the means by which significant quantities of relatively alkaline reactive material may be controlably administered to the scrubbing zone in a rapid manner.

The invention provides control to correct excursions in the pH of fluids present in the scrubbing zone of each scrubber on a "per scrubber" basis. The pH control is initially and rapidly effected by varying the recirculation rate of alkaline reactant to the scrubber. This technique will necessarily create a surplus or deficiency of additive within the system after some period of time and to avoid this, the additive-to-fuel input ratio is simultaneously varied to compensate for any such surplus or deficiency and return the system to steady state operation. The pH of fluids within the scrubbing zone of each scrubber is monitored and compared with a pH set point value and an error signal is generated for any difference therebetween. This error signal is used both to vary the recycle flow rate in the direction necessary to satisfy the error and to modify the ratio of additive-to-fuel input to the furnace in the direction necessary to satisfy the error.

In the event multiple scrubbers are in use, the pH of each will be monitored separately and an error signal generated for each. Each pH error signal accordingly modifies the recycle flow rate to its corresponding scrubber. The several pH error signals are averaged to provide a net pH error signal which in turn is used to modify the ratio of additive-to-fuel input to the furnace. Because the sulfur oxide removal characteristics of an additive may vary somewhat from one additive to another the invention further provides for modifying, within limits, the pH set point value in response to the sulfur oxide content measured in the scrubbed flue gas. This permits the present scrubber pH control system to attain the desired degree of sulfur oxide removal. The control system of the invention closely controls the pH of each scrubber through variations in the recycle rate, while performing the desired sulfur oxide removal function with a minimum consumption of additive.

DESCRIPTION OF THE PREFERRED EMBODIMENT

Figure 1:
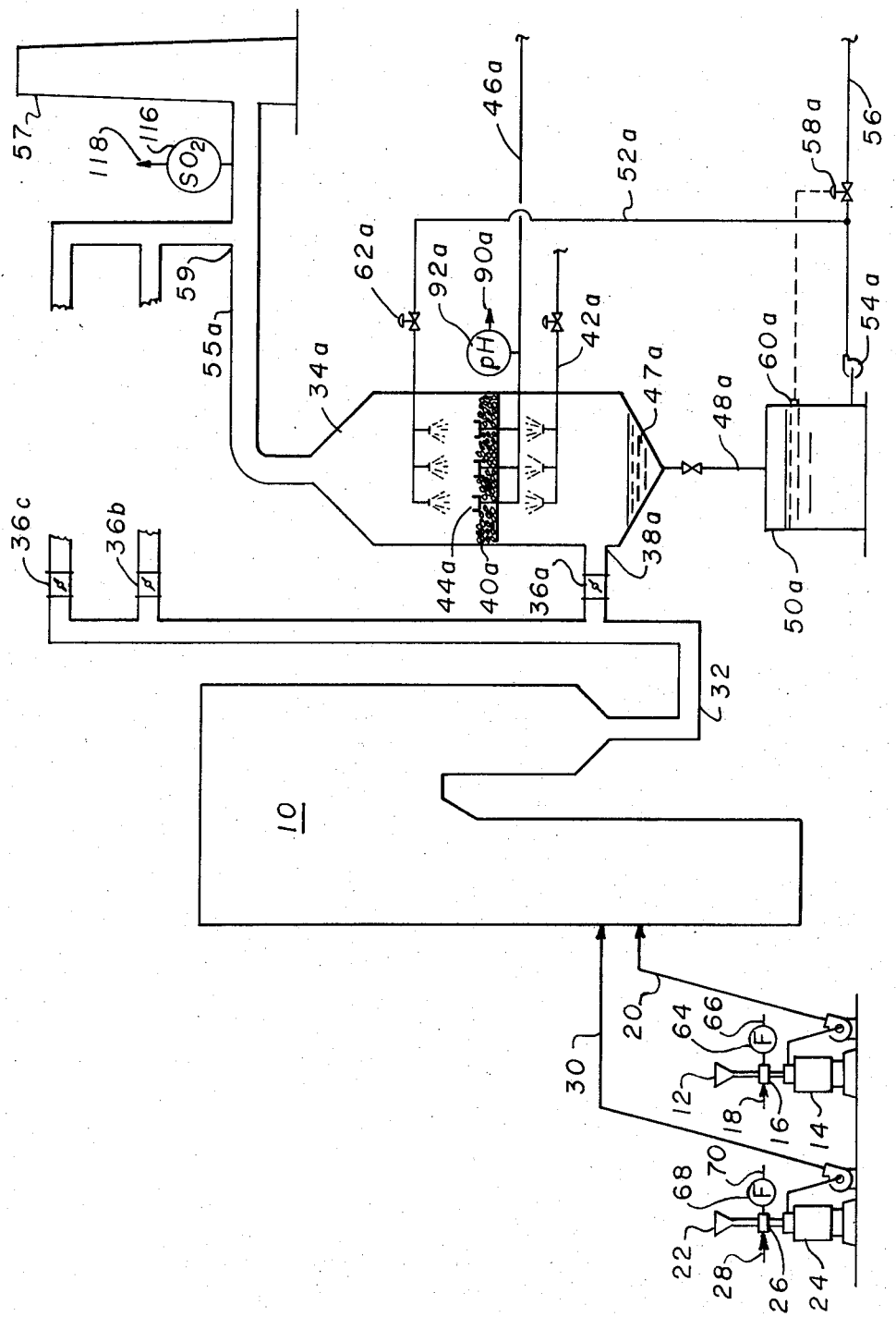
FIG. 1 is a diagrammatical illustration of an air pollution control system of the furnace injection type to which the control system of the invention is applied.

FIG. 1 depicts a typical furnace injection type of air pollution control system to which the control system of the invention is applicable. A fossil fuel is combusted within furnace 10. The fossil fuel may be coal, oil, or gas, however, because coal generally has greater quantities of sulfur than either oil or gas, the preferred embodiment will be described using high sulfur coal as the fuel. Coal stored in hopper 12 is delivered to pulverizer 14 by fuel feeder 16. The feed speed of feeder 16 may be varied by means of control signal 18 to control the rate at which coal is supplied to furnace 10. Pulverized coal is delivered to furnace 10 through pipe 20. A relatively low cost additive such as limestone and/or dolomite which has a high percentage of calcium and/or magnesium carbonate is stored in hopper 22 and is delivered to pulverizer 24 by means of a variable speed feeder 26. The feed speed of feeder 26 may be varied by means of control signal 28 to control the rate at which additive is supplied to the furnace 10. Additive is delivered to furnace 10 through pipe 30. Combustion of the coal results in the formation of sulfur oxides such as sulfur dioxide ($SO_2$) and sulfur trioxide ($SO_3$), and fly ash. These solid and gaseous components will exist in and be carried by the resulting flue gas stream which is to be ultimately discharged to the atmosphere, and it is their removal which is effected by the apparatus and control system of the invention. The coal and additive are supplied to furnace 10 concurrently and the heat from the combustion of the coal within the furnace serves to calcine the magnesium and/or calcium carbonates liberating carbon dioxide and resulting in magnesium and/or calcium oxides. While some carbonates may remain, the extent of calcination is substantially complete. The carbonates will react with the sulfur oxides only to a limited extent, however, the resulting alkaline earth metal oxides are much more reactive with both the $SO_2$ and $SO_3$ in both gaseous and aqueous environments. Some of the alkaline earth metal oxides react with some of the sulfur oxides, particularly $SO_3$, while in the flue gas stream resulting in solid alkaline earth metal sulfites and sulfates. However, most of the alkaline earth metal oxides and much of the $SO_2$ remain entrained in the flue gas stream downstream of furnace 10. A duct 32 receives the hot flue gas exhausted by furnace 10 and delivers it to wet scrubber 34. The quantity of flue gas exhausted from furnace 10 will vary considerably depending on the loading of furnace 10 with much greater quantities being exhausted at high load than at low load. Because the gas flow may vary significantly with the load imposed on the system, it may be desirable to employ a plurality of wet scrubbers 34 operating in parallel to effect the scrubbing operation. This requirement arises because the efficient operation of a typical wet scrubber depends upon the gas velocities through the scrubbing region thereof being within a particular range; whereas in fact, the range of gas velocities created by varying the load of a large furnace is far broader than this particular range. Accordingly FIG. 1 depicts a gas scrubbing system which employs three wet scrubbers connected in parallel, two of which are not shown. In depicting and describing the embodiment of FIGS. 1 and 2, those elements applicable only to a particular scrubber are given the letter subscripts which correspond to that scrubber. As the load on 10 varies and the rate of flue gas flow through line 32 also varies, individual scrubbers 34 *a*, 34*b*, and 34*c* may be selectively inserted into or withdrawn from operation by means of dampers 36*a*, 36*b*, and/or 36*c*. Hot flue gas is delivered through duct 32 to the inlet 38*a* of scrubber 34*a*. Heat exchange means such as an air preheater, not shown, may be interposed between furnace 10 and scrubber 34*a*.

Wet scrubber 34*a* typically is comprised of bed 40*a* of mobile contact elements such as marbles. The bed is supported by a perforated structure through which gas may upwardly pass. Water entering scrubber 34*a* through line 42*a* is sprayed upwardly against the underside of the bed 40*a*. This water spray wets the marbles in bed 40*a* and contacts the flue gas stream with additive entrained therein. The wetted marbles in bed 40*a* serve as a contact surface for the flue gas and are particularly effective in removing solid particulate therefrom. The alkaline earth metal oxides are soluble in the scrubber water and their contact with the water spray and wetted marbles removes them from the flue gas and places them in solution wherein they become more reactive with the $SO_2$ and $SO_3$ which is relatively insoluble in water. This reaction occurs according to the following equation:

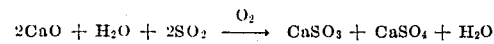

wherein calcium oxide is the alkaline earth metal oxide. The water introduced into scrubber 34*a* upon being contacted by the flue gas will then acquire particulate material in suspension and some solid and dissolved calcium and/or magnesium sulfates and sulfites. Some of this water, which collects in the area of bed 40*a*, will overflow into drain pots 44*a* and will be discharged from scrubber 34*a* through drain line 46*a* to a clarifier, not shown, where the entrained solids are removed. The remainder of this water falls to the bottom area 47*a* of scrubber 34*a* and passes from there through line 48*a* to a recycle tank 50*a*. Recycle tank 50*a* is capable of containing a substantial quantity of this watery slurry containing the dissolved alkaline earth metal oxides. The capacity of recycle tank 50*a* is such that at normal recycle flow rates there is provided a delay in the recirculation loop of about one-half hour. During this time most of the remaining alkaline earth metal oxides are converted to alkaline earth metal hydroxides.

The alkaline earth metal oxides upon entering a water environment begin a reaction in which the oxides become hydroxides. These hydroxides are subsequently available for reaction with the sulfur oxides, this reaction having been expressed above without showing the transition through the hydroxide state. The overall reaction including the hydroxide state can be shown as:

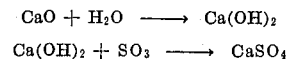

WHEN the calcium and/or magnesium exist in hydroxide state, they will readily react with the sulfur oxides to form precipitates which may be easily removed from the system. However, the conversion of magnesium and/or calcium oxide to hydroxide is not instantaneous but requires some time for reaction. Because not all of the calcium and/or magnesium oxides have reacted with sulfur oxides when first introduced to scrubber 34*a* and further because these oxides upon entering the hydroxide state become more reactive with the sulfur oxides, a portion of the watery slurry contained in recycle tank 50*a* is recycled to the scrubber bed 40*a* through line 52*a* by means of recycle pump 54*a*. The slurry which is recycled through line 52*a* is sprayed downwardly onto bed 40*a* of scrubber 34*a*. The fluid stream discharged by these sprays will readily react with the sulfur oxides in the continuously incoming flue gas and as with the underbed water spray, a portion will overflow into drain pots 44*a* and the remainder will fall to the bottom 47*a* of scrubber 34*a*. This recycle fluid stream and the underbed water spray combine to form an aqueous scrubbing medium within the region of bed 40*a* generally designated as the scrubbing region.

The flue gas after passing through the scrubbing zone will be substantially free of solid particulate and sulfur oxides. The substantially cleaned flue gas is discharged from scrubber 34a into duct 55a whereupon it is conveyed to a stack 57 for discharge to the atmosphere. Substantially cleaned flue gas from all other scrubbers which might be operating in parallel with scrubber 34a joins the cleaned flue gas in duct 55a at junction 59.

The recycle fluid stream because of its hydroxide content is relatively more alkaline than the liquid pool formed on bed 40a and overflowing into pots 44a. Because the input rate of water entering scrubber 34a through line 42a is normally constant, some of the watery slurry in tank 50a leaves the recycle circuit through line 56a to a clarifier, not shown. A control valve 58a in line 56a is controlled by liquid level indicator 60a in tank 50a such that the level of watery slurry in tank 50a is maintained substantially constant. Discharge line 56a thus relieves the system of a portion of the liquid added through line 42a.

A control valve 62a in recycle line 52a may be varied to control the flow rate of the recycle fluid stream as will be discussed more thoroughly below. Controlling the rate of addition of alkaline earth metal hydroxides in the recycle fluid stream to the scrubbing zone in scrubber 34a has been found to be an effective means of rapidly varying both the sulfur oxide removal and bed pH characteristics of scrubber 34. This capability permits short term corrections to be rapidly made for departures of pH or sulfur oxide removal levels from established nominal values.

Figure 2:
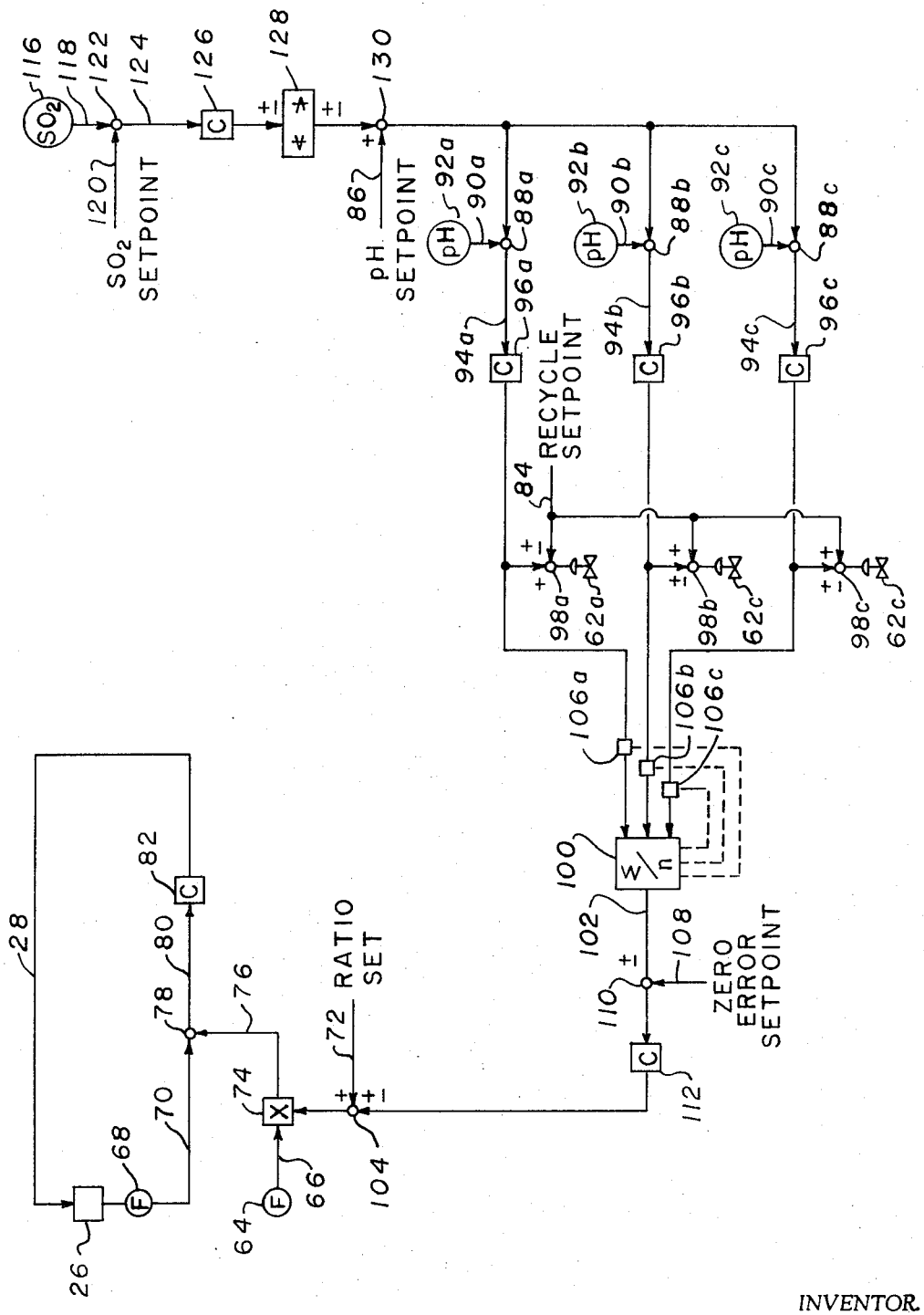
FIG. 2 is a schematic diagram of the control system of the invention.

In FIG. 2, there is shown the control system applied to the pollution control apparatus depicted in FIG. 1 for controlling the additive to fuel input ratio to furnace 10 and for controlling the flow rate of the fluid stream through recycle line 52. This control of the pollution control apparatus maintains the scrubbing zone in each scrubber 34 within certain pH limits and effects the desired degree of sulfur oxide removal from the flue gas stream with the minimum use of additive. Additive is delivered to furnace 10 at some predetermined ratio by weight to the amount of coal delivered to furnace 10 per unit time. As earlier noted the supply speed of coal feeder 16 is determined by a control signal 18 and the supply speed of additive feeder 26 is determined by control signal 28. The delivery rate of fossil fuel, in this instance coal, to furnace 10 is sensed by delivery speed transmitter 64 which provides fuel delivery rate signal 66. Correspondingly the delivery rate of additive, in this instance dolomite and/or limestone, to furnace 10 is sensed by delivery speed transmitter 68 which provides additive delivery rate signal 70. Typically the fuel delivery control signal 18 will vary with the load demand on furnace 10 and the additive delivery control signal 28 is derived in a manner such that additive material is delivered to furnace 10 at some ratio by weight to the coal supply rate (eg., 1:9). Both the additive and fuel supply signals 70 and 66 are compared to generate an error signal when the additive to fuel ratio departs from an established value. This this end there is provided a ratio set point signal 72 which is generally established by the operator and which modifies the fuel supply signal 66 through its multiplication therewith in multiplier 74. The output of multiplier 74 is a signal 76. Signals 76 and 70 are applied to a summation point 78 where they are compared and the algebraic difference therebetween is reflected as an error signal 80. Signal 80 is applied to a controller 82 which in turn provides the additive feeder speed control signal 28. The fuel supply signal 66 is thus scaled by means of ratio set point signal 72 and multiplier 74 such that signals 76 and 70 are equal at the desired additive-to-fuel ratio. As the fuel supply rate changes, signal 76 will change and an error signal 80 results to change the flow of additive feeder speed control signal 28 accordingly to maintain the established additive-to-fuel delivery ratio. The ratio set point 72 may be adjusted by the operator, if desired, to change the additive-to-fuel delivery ratio.

In addition to the basic additive-to-fuel delivery ratio established by the operator, an initial setting established for control valve 62 in recycle line 52a for each scrubber is selected such that approximately 75 percent of the total fluid entering recycle tank 50a is reinjected into scrubber 34a. This setting of valve 62a is obtained by control signal 84 which is an operator established recycle set point. The recycle set point 84 might differ for the several scrubbers in a system, however, in the preferred embodiment it is the same for all.

A control system which maintains an operator determined additive-to-fuel delivery ratio and recycle rate is helpful only to a limited extent. It is not capable of ensuring that each scrubber in a plural scrubber system will receive the same ratio of entrained additive to sulfur oxides as each of the others. Also, without more, the system is incapable of automatically accommodating changes in coal sulfur content or a change in additive characteristics. To avoid these shortcomings and to provide a control system which rapidly corrects for pH excursions which occur in the scrubbing zone of any of the scrubbers in operation, additional control is provided for varying the flow rate of the recycled fluid stream and for varying the additive-to-fuel delivery ratio.

According to the invention, a pH set point signal is established. This signal might differ from one scrubber to another if their geometries and materials differ, but generally a single pH set point value will serve all of the scrubbers. This pH set point signal is indicative of a desired value of pH in some representative area of the scrubbing zone of each scrubber. When limestone or dolomite is used as the additive, a pH of about 6 in the liquid within the scrubbing zone of a scrubber is about optimum.

When the pH goes much above 7, $CaSO_4$ precipitates and when the pH goes below 5, structures internal to scrubber 34a and particularly within the scrubber zone may be subjected to acid attack. The pH set point 86a is compared at summing junction 88a with a signal 90a which is indicative of an actual pH of the liquid within or exiting from the scrubbing zone of a particular scrubber. The pH signal 90a is obtained from a pH transmitter 92a which senses the pH of the effluent leaving scrubber bed 40a through drain pots 44a and drain line 46a. The 2868 series of pH measuring equipment manufactured by The Cambridge Instrument Company is satisfactory for this purpose. This measurement will usually be made in drain line 46a immediately outside of scrubber 34a and is accurately indicative of and substantially identical to the pH of the liquids within bed 40a. The pH set point signal 86a and actual pH signal 90a are compared at 88a such that a pH error signal 94a results for a difference therebetween. The pH error signal 94a passes through controller 96a and is then available for modifying both the additive-to-fuel delivery ratio and the recycle flow rate. The pH error signal 94a upon passing through controller 96a is algebraically added to recycle set point signal 84 at summing junction 98a, thus modifying the control position of valve 62a and accordingly, the flow rate of the fluid stream recycled through line 52a into scrubber 34a. The modification of recycle set point signal 84 by pH error signal 94a is such that the recycle flow rate is increased when the actual pH, indicated by signal 90a is less than the desired pH indicated by set point signal 86a and is decreased when the actual pH is greater than the desired pH. Controller 96a typically provides proportional and integral action to pH error signal 94a. As seen in FIG. 2 this control arrangement for maintaining scrubber pH by regulating the recycle flow rate is applicable independently to each scrubber 34a in the air pollution control system and the control elements applicable to only a single scrubber bear the subscript a, b, or c as indicated above. Thus it is seen that the pH of each scrubber in operation is sensed, a pH error signal for that scrubber is generated and the recycle flow rate for that scrubber is modified according to the resulting pH error signal for that scrubber. This modification of the recycle flow rate is, in most instances, capable of rapidly correcting for any excursions of pH within a particular scrubber from that scrubber's pH set point value. However, a change in the recycle flow rate will necessarily create, after a period of time, a deficiency or surplus of alkaline earth metal oxides and hydroxides. In order to return the air pollution control system to steady state operation, such deficiency or surplus must be compensated for by the amount of additive delivered to furnace 10. This change is effected by modifying the earlier mentioned, then existing, additive-to-fuel delivery ratio.

The existing additive-to-fuel ratio is modified by algebraically summing the pH error signal with additive-to-fuel ratio set point signal 72 to modify the ratio set input to multiplier 74. In an air pollution control system employing only one scrubber, a pH error signal would be algebraically added to ratio set signal 72. However, in the example of the preferred embodiment wherein multiple scrubbers, in this instance three, are available for parallel operation, means are provided for obtaining a net pH error signal which is an average of the cumulative pH errors in the individual scrubbers in operation. Accordingly each of the pH error signals 94a, 94b, and 94c for scrubbers 34a, 34b, and 34c respectively upon passing through controllers 96a, 96b, and 96c are applied to the input of an averaging logic element 100. Averaging element 100 algebraically sums the several pH error signals and divides the resulting sum by a factor of "n" (wherein "n" represents the number of inputs) to provide a net pH error signal 102. Because of possible asymmetry in the flue gas distribution to the scrubbers with plural scrubber operation, it is readily apparent that one or some scrubbers may operate at a pH higher than the desired value while one or others may operate at a pH lower than the desired value. In some instances, while individual corrective action in the recycle flow rate must occur for each scrubber, the net pH error within the system may be negligible requiring no change to the then existing additive to fuel delivery ratio. In the event that a net error signal 102 does result, it is applied to summing junction 104 where it algebraically is added to ratio set point signal 72 to modify the ratio set input to multiplier 74. The modification is such that when net pH error signal 102 reflects a system pH below the desired value, the amount of additive, relative to fuel, delivered to furnace 10 is increased and is decreased when net pH error signal 102 reflects a system pH above the desired value. Because the several scrubbers in operation are selectively insertable and removable from operation, averaging element 100 must be capable of averaging only the active inputs thereto. Accordingly switches 106a, 106b, and 106c, respectively receive pH error signals 94a, 94b, and 94c, respectively and are individually operative to apply or remove a pH error signal at the input of averaging element 100 and correspondingly adjust the value "n" by which the summed inputs are divided in the event a particular scrubber is inserted into or removed from operation in the system.

To the extent possible, it is desirable to return the recycle flow rates of the individual scrubbers to as near the established set point values as possible. Because controllers 96a, 96b, and 96c provide integration as well as proportionality to the pH error signals 94a, 94b, and 94c respectively passing therethrough, the integral component of the pH error signals may continue to exist at summing junction 98a, 98b, and 98c and at the inputs of averaging element 100 after the modification of the recycle flow rates has provided the scrubber pH's which satisfy the pH set point. The effect of these continuing integral components to the pH error signals is such that a new system equilibrium may be created wherein the integral component of the net pH error signal 102 continues to be applied at a constant value to the ratio set point signal 72 at summing junction 104 and the integral component of the pH error signal continues to be added to recycle set point signal 84 at summing junctions 98. The effect of the latter mentioned condition is to maintain the recycle flow rate at a value somewhat different than that established by the recycle set point 84. While such continued differences in the recycle flow rate from the set point value may be tolerable, particularly if small, it is generally desirable to provide control action which will return the flow rate of recycled fluids in the individual scrubbers to their set point values as established by signal 84. This control action is provided by a zero error set point 108 which serves as a zero reference and is applied to a summing junction 110 where it is compared with net pH error signal 102. The output of summing junction 110 is the algebraic difference between set point 108 and net pH error signal 102 and might be termed a secondary net pH error signal. This signal is passed through controller 112 and applied to summing junction 104 as the earlier mentioned pH error signal. Controller 112 is provided with integral action to integrate the aforementioned secondary pH error signal such that the effect of this error signal on the modification of the additive-to-fuel delivery ratio established by set point signal 72 establishes a new additive-to-fuel delivery ratio. This new ratio will ultimately result in a state of system equilibrium in which the pH in each scrubber is at set point and the average recycle flow rate is at set point.

While not essential to the pH control of the invention, a desirable feature of the preferred embodiment is the ability to modify the pH set point 86 within limits to accommodate changes in the sulfur oxide removal characteristics of the additive being introduced to furnace 10. The pH set point 86 is essentially established based on assumed additive characteristics which suggest an optimum pH value for attaining the desired degree of sulfur oxide removal from the flue gas. However, certain changes in the additive characteristics (for instance reactivity versus pH) may change the value of pH at which removal of sulfur oxides to the extent desired may be optimally accomplished. The control system as described above provides only for controlling the pH in the individual scrubbers to a particualr pre-established pH set point. However, the pH set point 86 may be modified within limits to provide scrubber pH control substantially as described above, with provision for permitting slight changes in scrubber pH to accommodate changes in additive characteristics in a beneficial manner.

Means are provided, in this instance $SO_2$ sensor and transmitter 116, for monitoring the amount of a sulfur oxide or oxides remaining in the flue gas following its passage through the scrubbers. $SO_2$ monitor 116 will conveniently be located in the flue gas duct near stack 57 such that an individual instrument monitors the combined flue gas stream resulting from a plurality of scrubbers. $SO_2$ transmitter 116 provides a signal 118 which is indicative of the actual $SO_2$ content of the flue gas at or near stack 57. The ultraviolet type $SO_2$ measuring equipment manufactured by the E. I. DuPont Company is satisfactory for this purpose. An $SO_2$ set point signal 120 is indicative of the maximum desired $SO_2$ content of the flue gas at stack 57. Typically $SO_2$ set point signal 120 will correspond to an $SO_2$ content of 1,000 ppm in the flue gas. Signal 118 indicative of actual $SO_2$ content in the flue gas is compared with $SO_2$ set point signal 120 at summing junction 122. The output of summing junction 122 equals the algebraic difference between inputs 118 and 122 and is an $SO_2$ error signal 124. $SO_2$ error signal 124 is passed through controller 126 and is applied to the input of a high and low limiter 128, the output of which is applied to summing junction 130 wherein it is algebraically added to the pH set point signal 86. High and low limiter 128 is of conventional construction and provides at its output a signal which is linearly proportional to the input within a predetermined range of input amplitudes and which is constant above and below said range of input signal amplitudes. Typically the limits on high and low limiter 128 are established such that $SO_2$ error signal 124 as passed by limiter 128 may vary by an amount which, as compared with pH set point signal 86, is equivalent to a range of two on the pH scale, and more particularly said output signal changes polarity at mid range to permit a plus or minus change of one unit on the pH scale. The $SO_2$ error signal 124 is thus able to modify the pH set point to which the individual scrubbers are controlled upwardly or downwardly one unit on the pH scale relative to the operator established pH set point 86. Assuming the operator established pH set point signal 86 is of a value equivalent to a pH of 6, the system control pH set point is now capable of varying between a pH of 5 and 7 as determined by the $SO_2$ content of the flue gases having passed through the scrubbers.

For convenience, the control system of my invention is preferably electrical in nature and the controllers indicated may be such as are manufactured by Leeds and Northrup Company or others which manufacture integrating type controllers. The controllers all provide proportional action, in which case the signal emitted is in some manner proportional to the signal received, and they also provide integration of the signals received wherein the emitted signal changes in strength in some proportion to both the magnitude and the time duration of the error between the received signal and the desired value.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth, but desire to avail myself of such changes as fall within the purview of my invention.

What is claimed is:

1. In a system for removing sulfur oxides from a flue gas stream resulting from the combustion of a fossil fuel and wherein alkaline earth metal additive material is delivered into the combustion zone and burned with fossil fuel delivered thereinto producing sulfur oxides and alkaline earth metal oxides which are entrained in the flue gas stream, the gas stream with entrained alkaline earth metal oxides is introduced to wet scrubbing means wherein it contacts in a scrubbing zone an aqueous medium comprising a water stream and a fluid stream obtained by recycling a portion of said aqueous medium following its contact with the flue gas and wherein the rate at which said aqueous medium is recycled may be varied to affect the pH in a region of said scrubbing means, said contact of said flue gas with said aqueous medium resulting in dissolved and precipitated sulfates and sulfites which are removed from the system and substantially cleaned flue gas which is discharged from the scrubbing means, the method of controlling the pH within the scrubbing means comprising the steps of:

establishing a first signal which controls the delivery rate of said additive material such that the delivery rate of additive material varies linearly with the delivery rate of said fossil fuel at a ratio thereto;

establishing a second signal which controls the rate at which said recycled fluid stream is delivered to the scrubbing zone of said wet scrubbing means, said signal having a predetermined reference value;

generating a signal indicative of the actual pH within a region of said scrubbing means;

establishing a set point signal indicative of a desired pH;

comparing said signal indicative of actual pH with said signal indicative of desired pH such that an error signal is provided which is indicative of any difference therebetween;

modifying said second signal with said error signal to vary the delivery rate of said recycled fluid stream in a direction to null said error signal; and simultaneously modifying said first signal with said error signal to vary the additive material to fossil fuel delivery ratio to return said second signal substantially to its reference value.

2. The method of claim 1 wherein said wet scrubbing means are a plurality of wet scrubbers each having an independent fluid stream recycled therethrough and said second signal controls the recycle rate to each said scrubber independently; said signal indicative of actual pH is generated for each said scrubber; each said signal indicative of actual pH of a scrubber is individually compared with said signal indicative of said desired pH to provide a corresponding pH error signal for each said scrubber; said second signal to each particular scrubber is modified by that pH error signal which correspondes to said particular scrubber, and including the additional step of, averaging all of the pH error signals for the system to provide a net pH error signal, said error signal which modifies said first signal being said net pH error signal.

3. The method of claim 1 having the additional steps of, generating a signal indicative of the sulfur oxide content of said substantially clean flue gas; and modifying within a limited range said set point signal indicative of desired pH with said signal indicative of sulfur oxide content.

4. The method of claim 2 having the additional steps of, generating a signal indicative of the sulfur oxide content of said substantially clean flue gas; establishing a signal indicative of a reference sulfur oxide content; comparing said signals indicative of actual and reference sulfur oxide content to provide an error signal indicative of a difference therebetween; and modifying within a limited range said set point signal indicative of desired pH with said sulfur oxide content error signal in a direction to correct said error.

5. The method of claim 4 wherein said limited range is a range of two on the pH scale.

6. The method of claim 5 wherein each said pH error signal includes a time integral component and said net pH error signal is compared with a zero error set point signal to provide a secondary net pH error signal; said secondary net pH error signal being said error signal which modifies said first signal and returning the average of said second signal to its reference value.

7. A system for removing sulfur oxides from a flue gas stream resulting from the combustion of fossil fuels comprising: means for regulating the supply of fossil fuel to a combustion area; means for regulating the supply of an additive material to the combustion area at a ratio to the fossil fuel supply rate; means for combusting said additive and fossil fuel materials in said combustion area producing oxides of the additive entrained in the resulting flue gas stream; wet scrubbing means for receiving said flue gas and contacting it in a scrubbing zone thereof with an aqueous medium comprising a water stream and a fluid stream obtained by recirculating a portion of said aqueous medium following its contact with said flue gas; means for regulating the rate at which said aqueous medium is recirculated, said recirculated aqueous medium affecting the pH in a region of the scrubbing means and said contact of flue gas with said aqueous medium resulting in dissolved and precipitated sulfates and sulfites which are removed from the system and substantially cleaned flue gas which is discharged from the scrubbing means; means sensing the pH of a fluid indicative of the pH within said region of the scrubbing means; means for comparing a desired pH with said sensed pH and establishing a pH error signal; means for regulating the recirculation rate of aqueous medium in response to said pH error signal in a direction to correct the error; and means for regulating the additive material to fossil fuel ratio in response to said pH error signal in a direction to correct the error.

8. The apparatus of claim 7 including means for sensing the sulfur oxide content of said substantially cleaned flue gas; means for comparing said sensed sulfur oxide content with a reference value of sulfur oxide content and establishing a sulfur oxide content error signal; and means for varying said desired pH within a limited range in response to said sulfur oxide content error signal in a direction to correct said error.

9. The apparatus of claim 8 wherein said scrubbing means are plural in number, each having independent recirculation of said aqueous medium therethrough; said means for sensing scrubber pH are operative to provide an individual pH indication for each of said scrubbers; said means for comparing sensed pH with desired pH are operative to provide a pH error signal for each of said scrubbers, each said pH error signal regulating the recycle rate of said aqueous medium to its corresponding scrubber; and including averaging means which receive and average the pH error signals from the plural scrubbers for providing a net pH error signal which is indicative of system pH error, said net pH error signal being said pH error signal which regulates the additive supply rate to said combustion area.

* * * * *